(12) United States Patent
Clark, Sr.

(10) Patent No.: US 6,248,011 B1
(45) Date of Patent: Jun. 19, 2001

(54) SAFETY CLOSURE FOR PRODUCT STUFFING MACHINE

(76) Inventor: William A. Clark, Sr., P.O. Box 452, New Alexandria, PA (US) 15670

( * ) Notice: Subject to any disclaimer, the term of this patent is extended or adjusted under 35 U.S.C. 154(b) by 0 days.

(21) Appl. No.: 09/145,098

(22) Filed: Sep. 1, 1998

(51) Int. Cl.[7] .................................................. A22C 11/06
(52) U.S. Cl. ................................................................ 452/42
(58) Field of Search ........................................ 452/40, 42

(56) References Cited

U.S. PATENT DOCUMENTS

| | | |
|---|---|---|
| 1,062,989 | 5/1913 | Naegelen . |
| 1,465,655 | 8/1923 | Schmidt . |
| 1,523,986 | 1/1925 | Schmidt . |
| 1,628,726 * | 5/1927 | Knowlton ................................ 452/45 |

FOREIGN PATENT DOCUMENTS

982871 * 2/1976 (CA) ...................................... 452/42

* cited by examiner

Primary Examiner—Willis Little
(74) Attorney, Agent, or Firm—Clifford A. Poff

(57) ABSTRACT

A stuffing machine for product such as ground sausage having a pivoting safety stop supported by a flanged end of a casing and a pivoting clamp assembly engageable with the flanged end. The clamp assembly supporting a retractable cover which is supported by the safety stop when in a closed position with respect to the casing. The pivoting safety stop and pivoting clamp assembly providing easy access for cleaning to an internal cavity of the casing as well as to a cover/safety stop seal and a safety stop/flange seal.

8 Claims, 4 Drawing Sheets

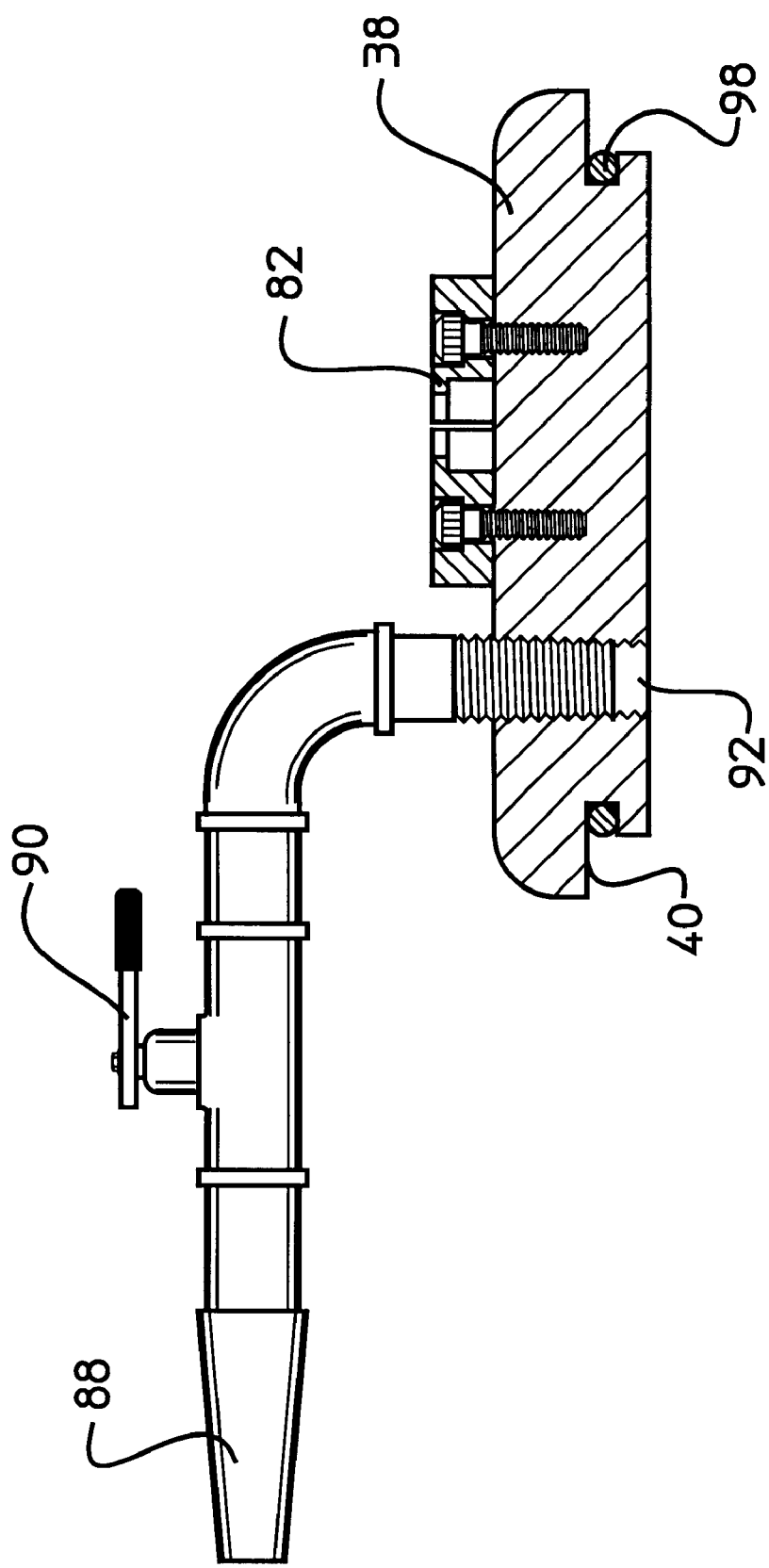

SAFETY CLOSURE FOR PRODUCT STUFFING MACHINE

BACKGROUND OF THE INVENTION

1. Field of the Invention

The present invention relates to machines used for stuffing product such as sausage and more particularly to a safety closure for such a machine.

2. Description of the Prior Art

It is well known in the art, as disclosed in U.S. Pat. No. 1,062,989 to Naegelen for example, to provide a machine for stuffing plastic product, such as ground sausage, having a piston located in an internal chamber which is driven against the plastic product by introduction of a pressurized medium in order to force the plastic product through a nozzle and into a casing.

Such machines have a cover removable for access to an internal chamber for loading of the product. It is also required, particularly where meat products are involved, that access be available for thorough cleaning and therefore highly desirable that such access be simplified.

However, militating against easy access to the internal chamber is the fact that the forces required to drive such product are frequently quite large, particularly where products of lesser fluidity are involved. Prior art stuffing machines lacking safety measures were subject to explosive ejection of the pistons resulting in injuries. Various methods for restricting such explosive ejection are known in the art. In the Naegelen U.S. Pat. (No. 1,062,989), a hinged cover is locked at an outer periphery through locking nuts carried on tie rods pivotally attached to the stuffer. Such a cover construction provides only limited safety relief because, as the Naegelen disclosure recognizes, the cover could be closed and pressure applied to the machine by an operator who had neglected to secure the lock nuts, resulting in explosive discharge. The Naegelen Patent discloses the provision of a relief valve triggered by an upwardly moving piston as a solution to the prospected unintentional unsecured cover. This solution however, involving a system interaction of trigger, lever, spring loaded valve stem and valve seat, is not failsafe and even when operational does not provide a stop for an already moving piston but merely lessens the pressure in the chamber behind the piston such that contact with an unsecured cover could still result.

Other systems for locking a cover of a stuffing machine are known, such as disclosed in U.S. Pat. No. 1,465,655 to Schmidt, in which a cover is restrained against opening by an external hinged yoke pivoted into position over a closed cover. However, the use of external restraints does not provide for a stop between the piston and the cover. The cover of the Schmidt device can be closed without the yoke being secured such that an operator could mistakenly apply pressure to an unsecured machine resulting in undesirable contact between the piston and an unlocked cover. The Schmidt disclosure includes the teaching of a triggered valve system for releasing pressure behind an upwardly driven piston prior to contact between piston and cover, similar to that found in Naegelen, and subject to the same limitations.

Accordingly, it is an object of the present invention to provide a safety closure for a product stuffing machine which allows for ready access to an internal product chamber of the machine for loading of product and for removal and necessary cleaning of surfaces which come in contact with the product.

It is a further object of the invention to provide a safety closure for a product stuffing machine in which a stopping feature to control a driven piston is direct and reliable and not dependent on system interactions for an indirect solution.

It is still a further object of the present invention to provide an improved product stuffing machine having as a safety feature the interaction of a safety stop with other machine components to reduce the likelihood of inadvertent pressurization with a closed but unsecured machine thereby reducing reliance on operator diligence.

SUMMARY OF THE INVENTION

According to the present invention, there is provided a stuffing apparatus for product such as ground sausage. The apparatus includes the combination of a casing having an internal chamber and an opening at a first end for receiving such product within the internal chamber; a piston slidably received within and removable from the internal chamber of the casing through the opening in the first end of the casing; a safety stop removably supported by the casing and having a portion confronting at least a portion of the opening in the casing thereby providing a restraint against unwanted removal of the piston from the internal chamber of the casing; a cover removably supported by the safety stop for covering a remaining portion of the opening in the casing unconfronted by the safety stop; and a clamp operably connecting the cover to the casing for retaining the cover and the safety stop in position with respect to the casing.

BRIEF DESCRIPTION OF THE DRAWINGS

These features and advantages of the present as well as others will be more fully understood when the following description is read in light of the accompanying drawings in which:

FIG. 6 is a view of the cover of FIG. 1 with a nozzle attached to the opening for delivery of product

DETAILED DESCRIPTION OF THE PREFERRED EMBODIMENT

Figure 1:
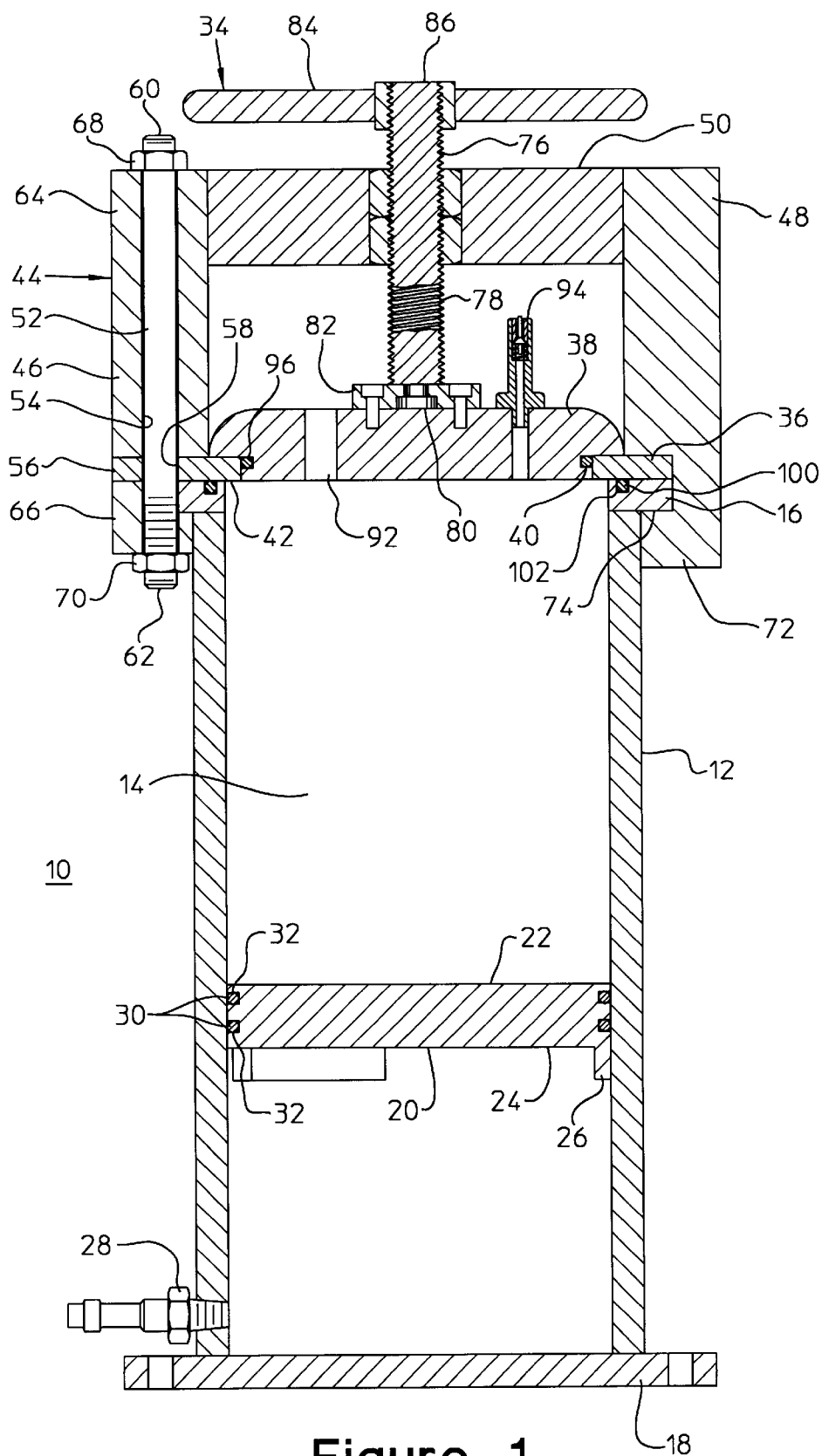
FIG. 1 is an elevational section view of a product stuffing machine according to the present invention.
Figure 2:
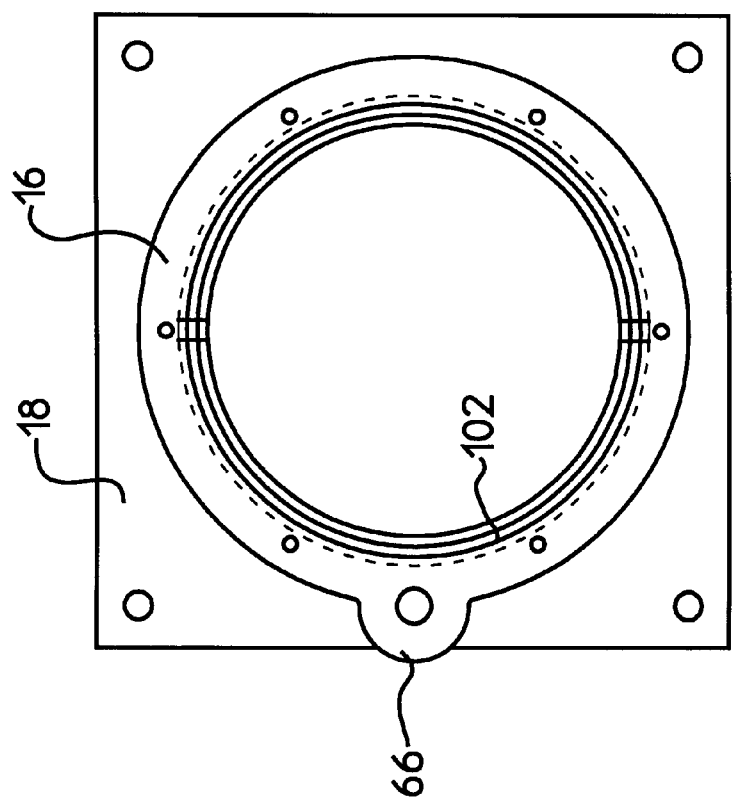
FIG. 2 is plan view of the casing of FIG. 1.

There is illustrated in FIG. 1 a product stuffing machine 10 according to the present invention. The machine 10 includes a cylindrical casing 12 having an internal chamber 14 in which product such as ground sausage is placed. The casing 12 has an outwardly projecting flange 16 at an open end and a bottom plate 18, seen in FIGS. 1 and 2, closing an opposite end, both the flange and the bottom plate suitably attached to the cylindrical portion of the casing 12 as by welding.

Figure 5:
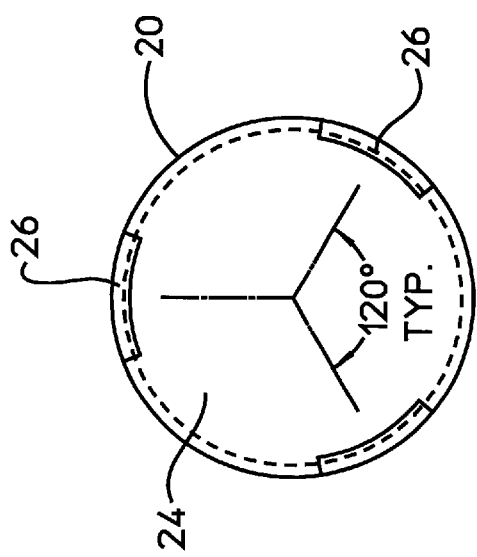
FIG. 5 is a bottom view of the piston of FIG. 1.

Slidably received within the internal chamber 14 through the open end is a piston 20 having a planar upper side 22 for contacting the product to be stuffed and an opposite lower side 24. The lower side of piston includes projecting supports 26, shown in FIGS. 1 and 5, to ensure clearance between the piston 20 and the bottom plate 18 for introduction of a medium, such as pressurized medium, into the internal chamber 14 through an inlet 28 located adjacent to the bottom plate 18. Alternatively, projections could extend from bottom plate 18 for maintaining such a gap for a piston having a planar lower side. The introduced medium pressurizes the space between the bottom plate 18 and the lower side 24 of the piston 20 for upwardly driving the piston in the manner well known in the art. To ensure that a driving pressure can be developed on the lower side 24, the piston 20 includes seals 30 located in seal grooves 32 formed on the side of the piston as best shown in FIG. 1.

The machine 10 includes a closure assembly 34 which provides the benefit of uncomplicated access to the internal chamber 14 for loading of product as well as to individual components of the assembly for cleaning. The need for access for thorough cleaning is vital where meat is involved, such as sausage, for which federal regulations impose strict cleaning requirements for those surfaces coming in contact with the food product.

Figure 3:
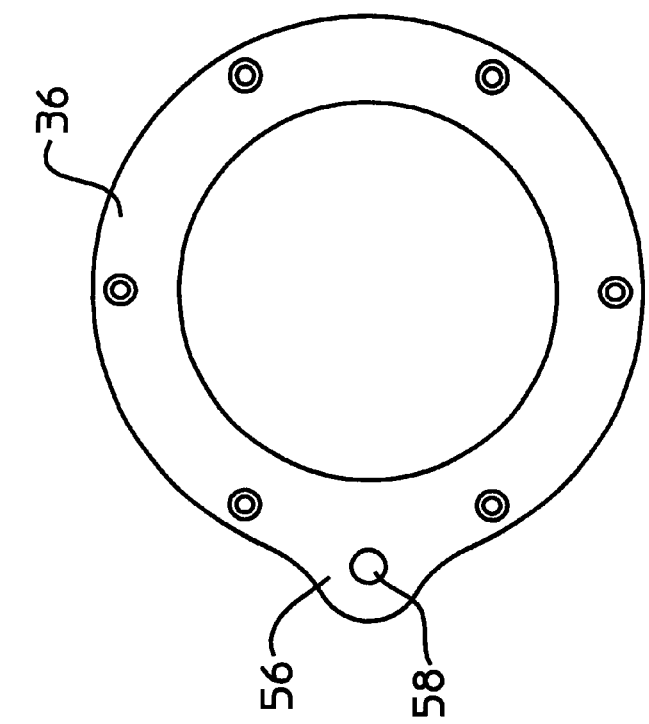
FIG. 3 is a plan view of the safety stop of FIG. 1.

The closure assembly 34 includes an annular safety stop 36, seen in FIGS. 1 and 3, which is positionable atop flange 16. A safety stop removably supported by the casing and having a portion confronting at least a portion of the opening in aid casing thereby providing a restraint against unwanted removal of the piston from the internal chamber of the casing. A cover 38 has a recessed portion 40 about an outer periphery of the lower surface which is supported by an inwardly projecting annular plate portion 42 of the annular safety stop 36. The cover 38 and the annular safety stop 36, when properly sealed as hereinafter described, provide closure for the open end of casing 12.

Figure 4A:
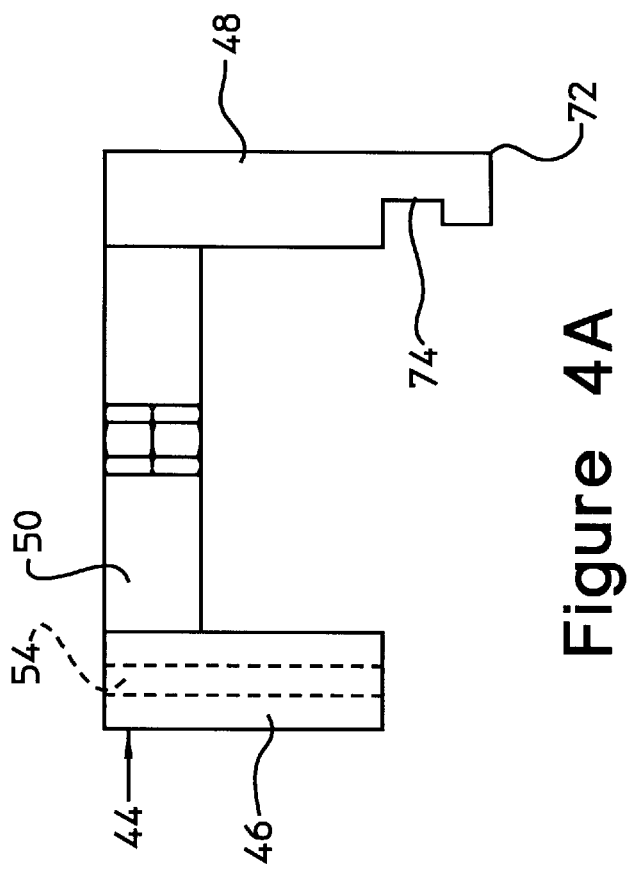
FIG. 4A and 4B is an elevational view and plan view, respectively, of the clamp assembly vertical arms and cross member of FIG. 1.
Figure 4B:
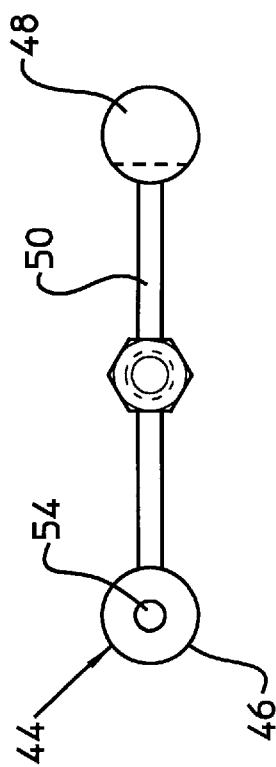

The closure assembly 34 further includes a clamp assembly 44, shown in FIGS. 4A and 4B, which provides for closure of the cover 38 as well as securement of the cover to the flange 16 of casing 12. The clamp assembly 44 includes vertical arms 46 and 48 which are interconnected by horizontal cross member 50. Vertical arm 48 is pivotally connected to the casing 12 by a pin 52 extending through an opening 54 in vertical arm 46. The pin 52 also extends through an opening 58 in a tab extension 56 of safety stop 36. Ends 60 and 62 of pin 52 extend beyond upper end 64 of vertical arm 46 and a tab extension 66 of flange 16, respectively, and are secured by nuts 68 and 70, respectively. With this construction, both the clamp assembly 44 and the safety stop 36 are pivotable with respect to the casing on which they are supported allowing for rapid access to the open end of casing 12.

The vertical arm 48 has a generally L-shaped end 72 forming a notch 74 such that when the clamp assembly 44 and safety stop 36 are pivoted into position over the casing 12, the notch contains a portion of the flange and the safety stop. In this configuration, the safety stop 36 is restricted against vertical movement with respect to casing 12 by virtue of its capture within notch 74 of vertical arm 48 at one side and by the pin connection of vertical arm 46 at an opposite side.

The cover 38 is connected to the clamp assembly 44 by rod 76 having a threaded central portion 78 which is threadedly engaged with cross member 50. End 80 of rod 76 is rotatably connected to cover 38 through bearing plate 82 which is bolted to the cover 38. In this fashion, the connection of rod end 80 to the cover provides for vertical support of the cover by the rod 76 while allowing for rotation of the rod with respect to the cover 38. A handle 84, attached to end 86 of rod 76 provides for rotation of rod 76 and therefore for extension and retraction of end 80 of rod 76 with respect to cross member 50. With the clamp assembly 44, the cover 38 and the safety stop 36 pivoted into position over the casing 12, extension of rod 76 with respect to cross member 50 brings cover 38 into contact with safety stop 36 for support thereon. Further extension of rod 76 secures cover 38 in position by creating compression between cover 38 and the L-shaped end 72 of vertical arm 48 through flange 16 and safety stop 36.

A nozzle 88 having a valve 90 is secured to opening 92 in cover 38 for delivery of product, as for example ground sausage into a casing attached to the nozzle. At a separate location in the cover 38 there is provided a valve 94, such as per se well known for tire inflation, for introduction of air into the upper portion of internal chamber 14 above piston 20 to return piston to bottom of the internal chamber.

In addition to preventing explosive discharge of piston 20 when properly secured, the above-described construction limits operator error by eliminating the possibility of a closed but unsecured cover for which an operator could inadvertently apply pressure believing the machine to be secured. The support of the cover 38 on safety stop 36 and the connection of the cover to the clamp assembly 44 ensures that the cover cannot be seated in position without the clamp assembly to which it is connected first being pivoted into position above the casing 12 with notch 74 capturing flange 16.

To provide a sealed enclosure for facilitating pressurization of internal chamber 14 of casing 12, the connection of cover 38 to safety stop 36 is sealed and the connection of safety stop to flange 16 of casing 12 is sealed. Elastomeric seal 96 is located in seal groove 98 in cover 38 to form the cover/safety stop seal. Similarly, elastomeric seal 100 is located in seal groove 102 in flange 16 to form the safety stop/casing seal.

A major benefit of the construction of the closure assembly 34 in addition to the safety features and rapid access to the internal chamber of the casing already discussed resides in the rapid access which is also afforded to seals 96 and 100 for full cleaning of all surfaces which may come into contact with the product being processed by the stuffing machine 10. By retracting rod 76 with respect to cross member 50 and separating cover 38 from connection to safety stop 36, access is provided to seal 96 for removal of seal 96 and cleaning of all surfaces of cover 38 including seal groove 98 Similarly, by pivoting clamp assembly 44 and safety stop 36 away from casing 12, access is provided to seal 100 for removal of seal 100 and cleaning of surfaces of casing 12 including seal groove 102.

The present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

I claim:

1. A sausage stuffing apparatus including the combination of:

a casing having an internal chamber with a closed end and a sausage discharge end opposite thereto for receiving sausage product within said internal chamber;

a piston having a cynical outer surface interrupted by spaced apart o-rings forming slidable seals to isolate sausage product between said piston and said sausage discharge end of said casing, said casing having an inlet opening adjacent said closed end for introduction of a pressurized medium to apply a driving force to said piston;

a safety stop supported by said casing in a sealed engagement with said sausage discharge end, said safety stop having a portion confronting a portion of said internal chamber forming a restraint against unwanted removal of said piston from the internal chamber of said casing;

a cover in a sealed engagement with said safety stop for closing the portion of said internal chamber exposed by said safety stop, said cover having a sausage discharge opening and a media delivery opening communicating with said internal chamber of said casing;

a nozzle controlled by a valve communication with said sausage discharge opening for delivery of sausage product from said internal chamber of said casing to a location exterior of said casing;

a valve operable to deliver pressurized media to said media delivery opening for forcing said piston in a direction away from said safety stop along said internal chamber; and a clamp operable to maintain said sealed engagement of said safety stop and said cover with respect to said casing.

2. The stuffing apparatus according to claim 1, further including a first seal located between said casing and said safety stop and a second seal located between said cover and said safety stop.

3. The stuffing apparatus according to claim 2, wherein said casing includes a first seal groove in which said first seal is located and wherein said cover includes a second seal groove in which said second seal is located, said first seal removable from said first seal groove when said safety stop is removed from said casing, said second seal removable from said second seal groove when said cover is removed from said safety stop.

4. The stuffing apparatus according to claim 1, wherein said casing is cylindrical having an outwardly extending flange at said sausage discharge end and wherein said safety stop includes an annular plate portion supportable on said outwardly extending flange of said casing, said cover supported by said annular plate portion of said safety stop, said clamp including a pair of generally vertically extending arms and a generally horizontal cross member extending between said arms, one of said arms having a notch for receiving a portion of said casing and the other of said arms being pivotally supported by a pin mounted to an extension of said outwardly extending flange.

5. The stuffing apparatus according to claim 4, wherein said clamp further includes a rod with said cross member said rod having an end rotatably connected to said cover for compression of said safety stop between said cover and said casing upon threaded extension of said rod from said cross head toward said casing said notch capturing and restricting said safety stop against vertical movement with respect to said casing.

6. The sing apparatus according to claim 5, wherein said cover includes a bearing plate for rotatably receiving said end of said rod.

7. The stuffing apparatus according to claim 4 wherein said safety stop includes a portion located in said notch.

8. The stuffing apparatus according to claim 5 wherein said safety stop includes a tab portion located between said other of said arms and said casing, and wherein said clamp further includes a pin extending through an aperture in said tab portion and into said other of said arms and said casing allowing for pivot of said safety stop away from said sausage discharge end of said casing.

* * * * *